United States Patent
Azmandian (10) Patent No.: US 12,300,221 B2
(45) Date of Patent: May 13, 2025

(54) METHODS FOR EXAMINING GAME CONTEXT FOR DETERMINING A USER'S VOICE COMMANDS

(71) Applicant: Sony Interactive Entertainment Inc., Tokyo (JP)

(72) Inventor: Mahdi Azmandian, San Mateo, CA (US)

(73) Assignee: SONY INTERACTIVEENTERTAINMENT INC., Tokyo (JP)

(*) Notice: Subject to any disclaimer, the term of this patent is extended or adjusted under 35 U.S.C. 154(b) by 186 days.

(21) Appl. No.: 17/827,680

(22) Filed: May 28, 2022

(65) Prior Publication Data

US 2023/0386452 A1 Nov. 30, 2023

(51) Int. Cl.
*G10L 15/08* (2006.01)
*A63F 13/40* (2014.01)

(52) U.S. Cl.
CPC .............. *G10L 15/08* (2013.01); *A63F 13/40* (2014.09); *A63F 2300/1081* (2013.01)

(58) Field of Classification Search
CPC .. G10L 15/08; A63F 13/40; A63F 2300/1081; A63F 13/424; A63F 13/533; A63F 13/67; A63F 13/215
See application file for complete search history.

(56) References Cited

U.S. PATENT DOCUMENTS

| | | | |
|---|---|---|---|
| 10,629,192 B1 * | 4/2020 | Streat | G10L 15/063 |
| 2002/0099542 A1 * | 7/2002 | Mitchell | G06F 40/137 |
| | | | 704/E15.04 |
| 2017/0189815 A1 * | 7/2017 | Tweedale | A63F 13/79 |
| 2019/0088260 A1 * | 3/2019 | Vachhani | G10L 25/63 |
| 2019/0270019 A1 * | 9/2019 | Miura | H04N 21/4781 |
| 2020/0330856 A1 * | 10/2020 | Akemann | A63F 13/424 |
| 2021/0264916 A1 * | 8/2021 | Kim | G10L 15/22 |
| 2022/0309270 A1 * | 9/2022 | Small | G06V 40/176 |
| 2022/0347584 A1 * | 11/2022 | Zimring | A63F 13/235 |

FOREIGN PATENT DOCUMENTS

WO WO-9531264 A1 * 11/1995 ........... A63F 7/0058

OTHER PUBLICATIONS

WO9531264A1-Original (Year: 1995).*
PCT/US2023/018840, International Search Report and Written Opinion, International Searching Authority, ISA/220, Aug. 1, 2023.

* cited by examiner

*Primary Examiner* — Bhavesh M Mehta
*Assistant Examiner* — Darioush Agahi
(74) *Attorney, Agent, or Firm* — Kilpatrick Townsend & Stockton LLP (57) ABSTRACT

A method for executing a session of a video game is provided, including the following operations: recording speech of a player engaged in gameplay of the session of the video game; analyzing a game state generated by the execution of the session of the video game, wherein analyzing the game state identifies a context of the gameplay; analyzing the recorded speech using the identified context of the gameplay and a speech recognition model, to identify textual content of the recorded speech; applying the identified textual content as a gameplay input for the session of the video game.

7 Claims, 6 Drawing Sheets

METHODS FOR EXAMINING GAME CONTEXT FOR DETERMINING A USER'S VOICE COMMANDS

BACKGROUND

1. Field of the Disclosure

The present disclosure relates generally to examining game context for determining a user's voice commands in a video game.

2. Description of the Related Art

The video game industry has seen many changes over the years. As technology advances, video games continue to achieve greater immersion through sophisticated graphics, realistic sounds, engaging soundtracks, haptics, etc. Players are able to enjoy immersive gaming experiences in which they participate and engage in virtual environments, and new ways of interaction are sought.

It is in this context that implementations of the disclosure arise.

SUMMARY

Implementations of the present disclosure include methods, systems, and devices relating to examining game context for determining a user's voice commands in a video game.

In some implementations, a method for executing a session of a video game is provided, including the following operations: recording speech of a player engaged in gameplay of the session of the video game; analyzing a game state generated by the execution of the session of the video game, wherein analyzing the game state identifies a context of the gameplay; analyzing the recorded speech using the identified context of the gameplay and a speech recognition model, to identify textual content of the recorded speech; applying the identified textual content as a gameplay input for the session of the video game.

In some implementations, the method is performed in substantial real-time, so that analyzing the game state is performed in substantial real-time as the game state is continually updated by the execution of the session, and so that the analyzing to identify the textual content of the recorded speech is responsive in substantial real-time to changes in the game state.

In some implementations, the identified context of the gameplay includes an identified scene or stage of the video game.

In some implementations, the identified context of the gameplay includes an identified virtual location in a virtual environment defined by the execution of the session of the video game.

In some implementations, the identified context of the gameplay includes identified attributes of an avatar of the player in the video game.

In some implementations, analyzing the game state includes recognizing activity occurring in the gameplay, the recognized activity at least partially defining the identified context of the gameplay.

In some implementations, analyzing the game state includes predicting future gameplay activity, the predicted future gameplay at least partially defining the identified context of the gameplay.

In some implementations, a method for executing a session of a video game is provided, the method including: recording speech of a player engaged in gameplay of the session of the video game; analyzing the recorded speech using a speech recognition model, which identifies a plurality of candidate words as possible interpretations of the speech of the player; during the session of the video game, presenting the plurality of candidate words to the player; receiving selection input from the player identifying one of the candidate words as a correct interpretation of the speech of the player; applying the selected one of the candidate words by the video game as a gameplay input for the video game.

In some implementations, presenting the plurality of candidate words is responsive to a level of confidence of recognition by the speech recognition model falling below a predefined threshold.

In some implementations, presenting the candidate words to the player includes presenting the candidate words in video generated from the session of the video game.

In some implementations, presenting the candidate words pauses the gameplay until the selection input has been received.

In some implementations, applying the selected one of the candidate words includes triggering a command for the gameplay of the video game.

In some implementations, the selected one of the candidate words is used as feedback to refine the speech recognition model.

In some implementations, receiving selection input is through an input device of a controller.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide methods, systems, and devices for examining game context for determining a user's voice commands in a video game.

Broadly speaking, implementations of the present disclosure are drawn to methods and systems for providing contextual automatic speech recognition in a video game. As a player plays a given video game the context of the gameplay in which the player interacts with the virtual environment of the video game is constantly changing. However, the context of the gameplay can provide important clues as to what a player may be saying at any given moment. Thus, in accordance with implementations of the disclosure, the gameplay context is utilized to enhance speech recognition of a player. For example, aspects of the gameplay such as the scene or setting, characteristics of the player's avatar, movements of the player's avatar, etc. are used to improve speech recognition. In some implementations, speech is used to provide commands for the gameplay, and thus it is important to achieve highly accurate speech recognition in order to provide a high quality gameplay experience for the player. In some implementations, if the system is unable to determine with sufficient level of confidence the correct interpretation of the player's given speech, then candidate words or phrases can be presented to the player to choose from and thereby indicate which is the correct interpretation of the user's speech.

With the above overview in mind, the following provides several example figures to facilitate understanding of the example embodiments.

Figure 1:
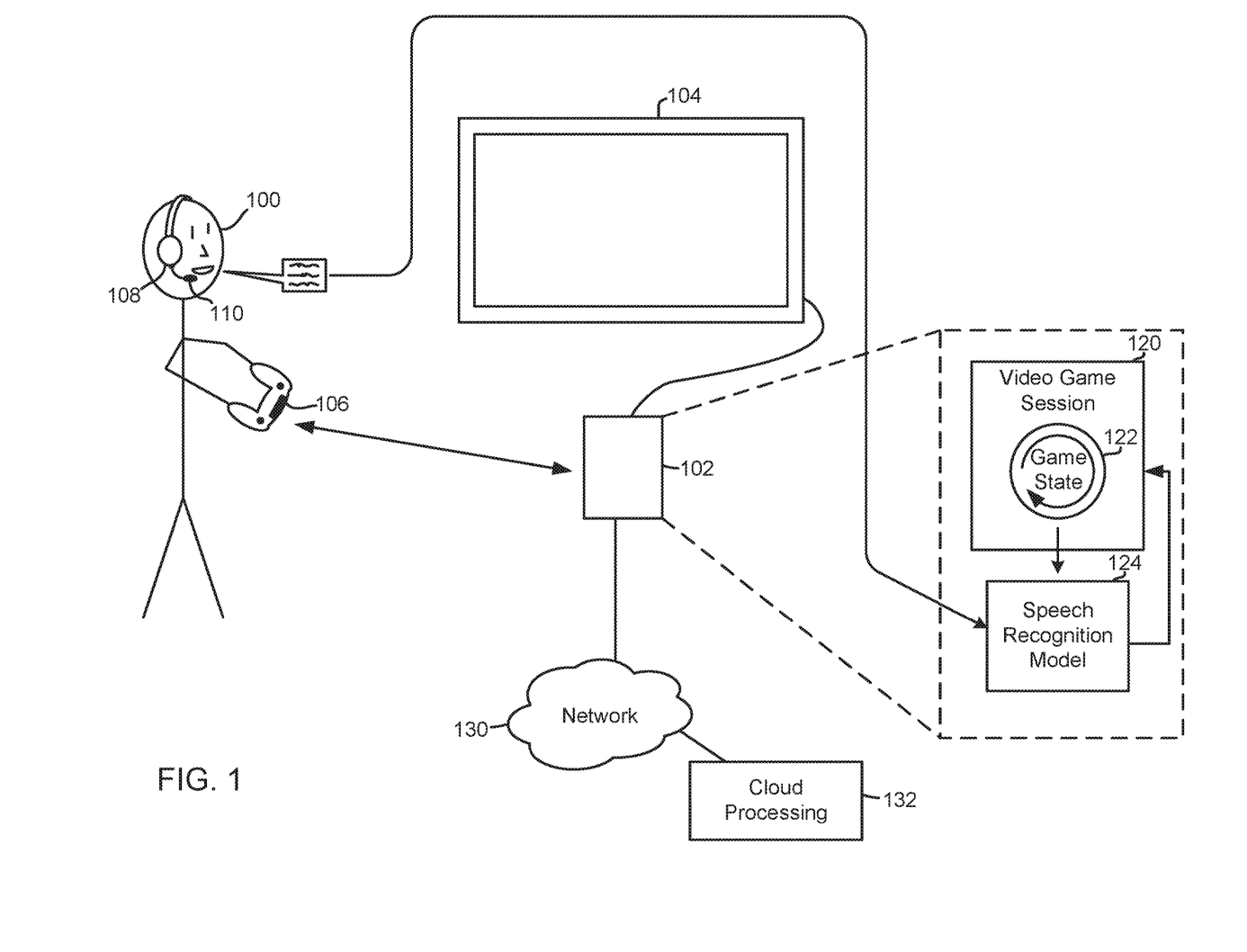
FIG. 1 illustrates a user engaged in gameplay of a video game, in accordance with implementations of the disclosure.

FIG. 1 illustrates a user engaged in gameplay of a video game, in accordance with implementations of the disclosure.

In the illustrated implementation, a user/player 100 is engaged in interactive gameplay of a video game that is executed by a computing device 102. By way of example without limitation, the computing device 102 can be a game console, personal computer, laptop, set-top box, or other general or special purpose computer having a processor and memory and capable of executing program instructions of a video game. Furthermore, while for purposes of illustrating an embodiment of the disclosure, a user interacting with a video game is described, it will be appreciated that the principles of the present disclosure can be applied to other types of interactive applications which may be executed by the computing device 102 and that the user 100 may interact with. Additionally, it will be appreciated that in other implementations, at least some of the functionality ascribed to the computing device 102 can be cloud-executed by a remote cloud processing resource 132 accessed over a network 130 (e.g. including the Internet).

In some implementations, the computing device 102 executes a session 120 of the video game, which includes generation of a game state 122 and rendering video and audio of a virtual environment of the video game. The video is presented on a display 104 (e.g. television, monitor, LED/LCD display, projector screen, etc.) viewed by the user 100. In some implementations, the display 104 is in the form factor of a head-mounted display (HMD) worn by the user. As the user 100 engages in interactivity with the video game, the user 100 may operate a user input device such as a controller 106 in the illustrated implementation, that generates user input for the video game. It will be appreciated that the executing video game is responsive to the user input generated as a result of the user's interactivity, and continually updates its game state based on the user input to drive the execution of the video game.

The audio generated by the video game can be presented through an audio device such as speakers (which can be included in the display 104, or as shown in the illustrated implementation, headphones 108 worn by the user 100. The headphones 108 can be wired or wireless, and may be connected directly or indirectly to the computing device 102. For example, in some implementations, the headphones 108 connect to the controller 106, and the controller 106 communicates with the computing device 102 to receive audio that it then passes to the headphones 108 for presentation.

Broadly speaking, implementations of the present disclosure are drawn to methods and systems providing context-based speech recognition in video games. Accordingly, the user's 100 speech during gameplay is captured by a microphone 110. In the illustrated implementation, the microphone 110 is connected to the headphones 108. However, in other implementations, the microphone can be a separate device, incorporated into the controller 106, part of another device that senses the local environment (e.g. device having a camera and microphone for detecting the user and the local environment), part of an HMD worn by the user, or otherwise provided in manner enabled to capture the speech of the user during gameplay.

The speech of the user 100 is captured and recorded as audio data. The recorded audio data is analyzed using a speech recognition model 124 to identify the textual content of the user's speech. More specifically, to improve the speech recognition, the current context of the user's gameplay is identified and applied to the speech recognition model. It will be appreciated that in a given gaming context, the user is more likely to say certain words or phrases, as opposed to another gaming context. For example, in a combat scene the user is more likely to speak words or phrases that are specific to the combat, such as issuing commands for firing a weapon or initiating attacks against an enemy. Thus, by understanding the game context, automatic speech recognition of a user's speech can be improved.

In some implementations, the game state 122 is analyzed in order to identify the context of the user's gameplay. It will be appreciated that the gameplay is dynamic and accordingly the context can change from moment to moment. Therefore, in some implementations, to optimize the speech recognition, a real-time or substantial real-time understanding of the game context is applied. In this manner, the ability of the speech recognition model 124 to determine the textual content of the user's (recorded) speech is responsive to the real-time changes happening during the gameplay as reflected in the game state which is continually being updated during interactive gameplay.

In some implementations, the game state 122 is analyzed using a trained machine learning model configured to recognize or identify the gameplay context. In some implementations, such a machine learning model can be configured to predict the future gameplay activity/context based on the current game state, and this information may also be used to enhance the automatic speech recognition. Broadly speaking, the speech recognition model 124 is adjusted based on the determined gameplay context, for example, to favor or weight textual determinations which are more likely in view of the gameplay context.

After the textual content (words or phrases) of the user's speech is determined, this can be applied to the video game session 120. For example, the textual content can be interpreted to trigger one or more commands applied for the gameplay. In this manner, improved speech recognition is enabled for better recognition of voice commands used during gameplay of the video game.

Though in the illustrated implementation as shown, the video game and speech recognition are carried out by the computing device 102, in other implementations either or both of the video game and speech recognition can be executed/performed remotely by a cloud processing resource 132 accessed via a network 130. In some implementations, the recorded audio of the user speech can be transmitted to the cloud processing resource 132 to be analyzed using the speech recognition model and the game context to determine the textual content of the user speech.

Figure 2:
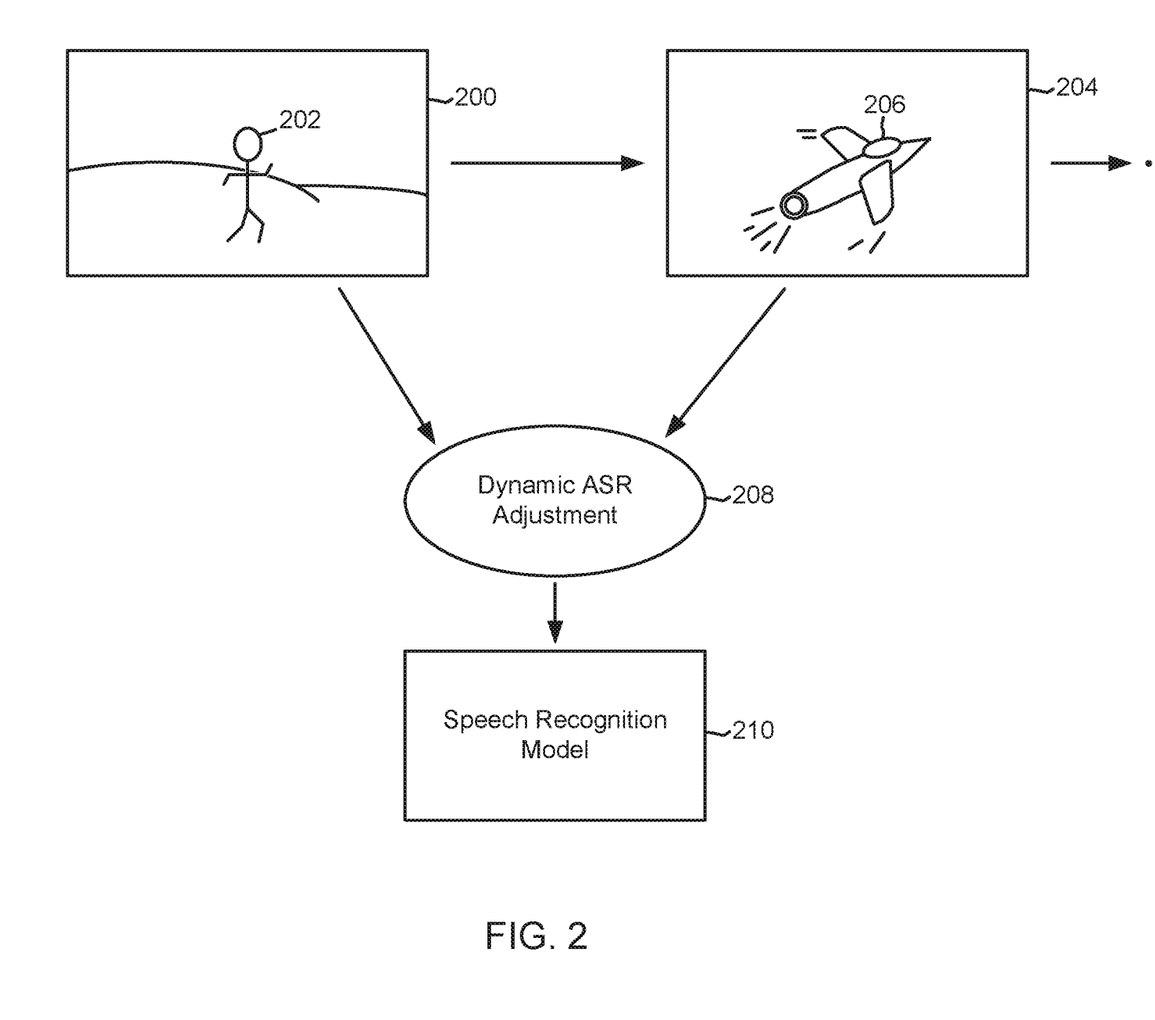
FIG. 2 conceptually illustrates dynamic adjustment of a speech recognition model based on changing game contexts, in accordance with implementations of the disclosure.

FIG. 2 conceptually illustrates dynamic adjustment of a speech recognition model based on changing game contexts, in accordance with implementations of the disclosure.

It will be appreciated that the context of gameplay of a video game continually changes as the user progresses during a session. For example, in the illustrated implementation, at an earlier time point, a player may be engaged in gameplay in a first scene 200 of the video game, in which the player may control a character avatar 202. Whereas at a later time point of the session, the player may be engaged in gameplay in a second scene 204 of the video game, in which the player may control an airplane 206, by way of example without limitation. It will be appreciated that the types of speech that the player is likely to say during such scenes is different as the nature of the scenes and what is called for in terms of gameplay activity is different (e.g. control of a character avatar versus control of an airplane/vehicle).

Therefore, a dynamic automatic speech recognition (ASR) adjustment process 208 is performed, which adjusts a speech recognition model 210 based on the game context occurring at that time. In some implementations, the dynamic ASR process includes analyzing the game state of the video game in order to determine the current gameplay context. In some implementations, the game state is analyzed using a machine learning model that is trained to recognize or identify the context of gameplay of the video game. By way of example without limitation, the game context can include identifying aspects that describe the type of gameplay occurring, such as the setting, scene, stage, section, virtual/spatial location within a virtual environment, progress, timeline/temporal location within a campaign storyline, current goals, character/avatar attributes, abilities, inventories, achievements, skill levels, etc. or other types of information about the gameplay that may influence the likelihood of the player to speak particular words or phrases during gameplay.

For example, during scene 200 the player controls a character avatar 202, and therefore will be more likely to speak words/phrases relating to control of the character avatar 202. Whereas in the scene 204, the player controls an airplane 206, and therefore will be more likely to speak words/phrases relating to control of the airplane 206. Accordingly, during each of the scenes 200 and 204, the dynamic ASR adjustment process 208 adjusts the speech recognition model 210 in different ways to favor the relevant and more likely spoken words, such as by adjusting/tuning weights or variables of the speech recognition model 210.

In various implementations, the speech recognition model can be based on various recognition models known in the art, and may include acoustic and language models. In some implementations, the speech recognition model is based on a Hidden Markov model, an artificial neural network, a deep neural network, an AI/machine learning model, or other type of suitable modeling mechanism.

Figure 3:
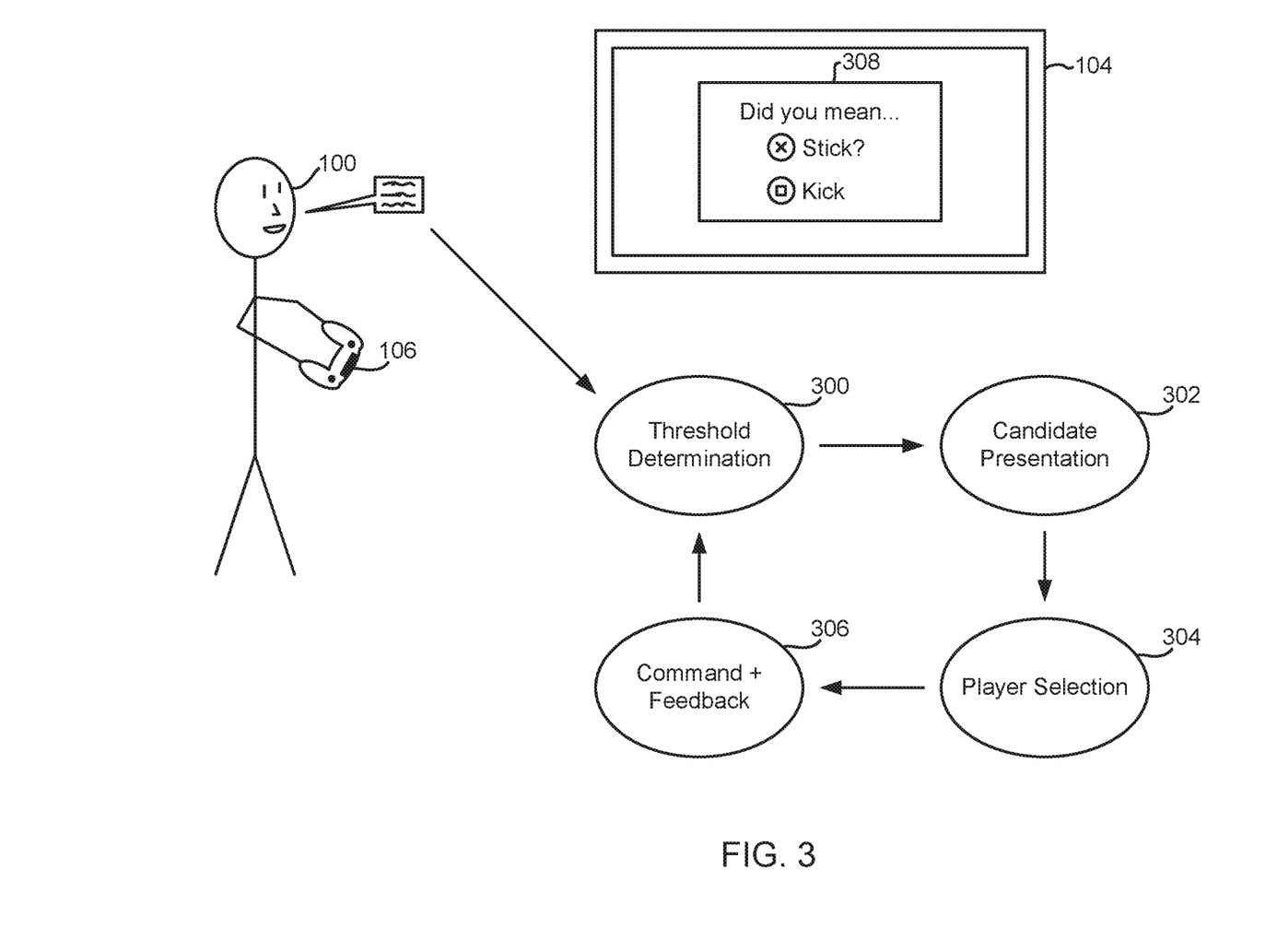
FIG. 3 conceptually illustrates a player providing feedback regarding speech recognition applied to their speech during gameplay of a video game, in accordance with implementations of the disclosure.

FIG. 3 conceptually illustrates a player providing feedback regarding speech recognition applied to their speech during gameplay of a video game, in accordance with implementations of the disclosure.

In the illustrated implementation, the player 100 is engaged in gameplay of a video game, with gameplay video being rendered on the display 104. As has been discussed, automatic speech recognition is applied to the speech of the player 100. Also as has been noted, the gameplay context can be determined and used to improve the outcomes of the speech recognition process. However, in some cases, the speech of the player 100 may not be recognized with a sufficient degree of confidence. Therefore, in some implementations, a method for requesting additional feedback from the player is implemented. For example, at operation 300 a threshold determination regarding the confidence of speech recognition is made. If the player's speech is recognized by the speech recognition model with a level of confidence meeting or exceeding a predefined threshold, then the recognized textual content of the player's speech is applied as previously discussed. However, if the level of confidence is below the predefined threshold, then at method operation 302, the system identifies potential candidate words/phrases that are possible interpretations of the player's recorded speech. These candidates are presented to the player 100, such as by presenting a dialogue window 308 on the display 104 asking the player 100 whether they intended to say one of the candidate words/phrases.

At operation 304, the player 100 may respond by indicating selection of one of the candidates as the correct interpretation. For example, the dialogue window 308 may indicate that specific buttons on the controller 106 operated by the player 100 are correlated to the presented candidate words/phrases, so that the player may indicate selection of a given candidate word/phrase by pressing the corresponding controller button.

At operation 306, the word/phrase indicated as the correct interpretation of the player's speech is applied to the video game, such as by triggering a command for the gameplay. Furthermore, the information about the correct interpretation of the player's speech can be used as feedback or further training data for the speech recognition model, so as to improve the speech recognition model's accuracy in determining the textual content of the player's speech.

Figure 4:
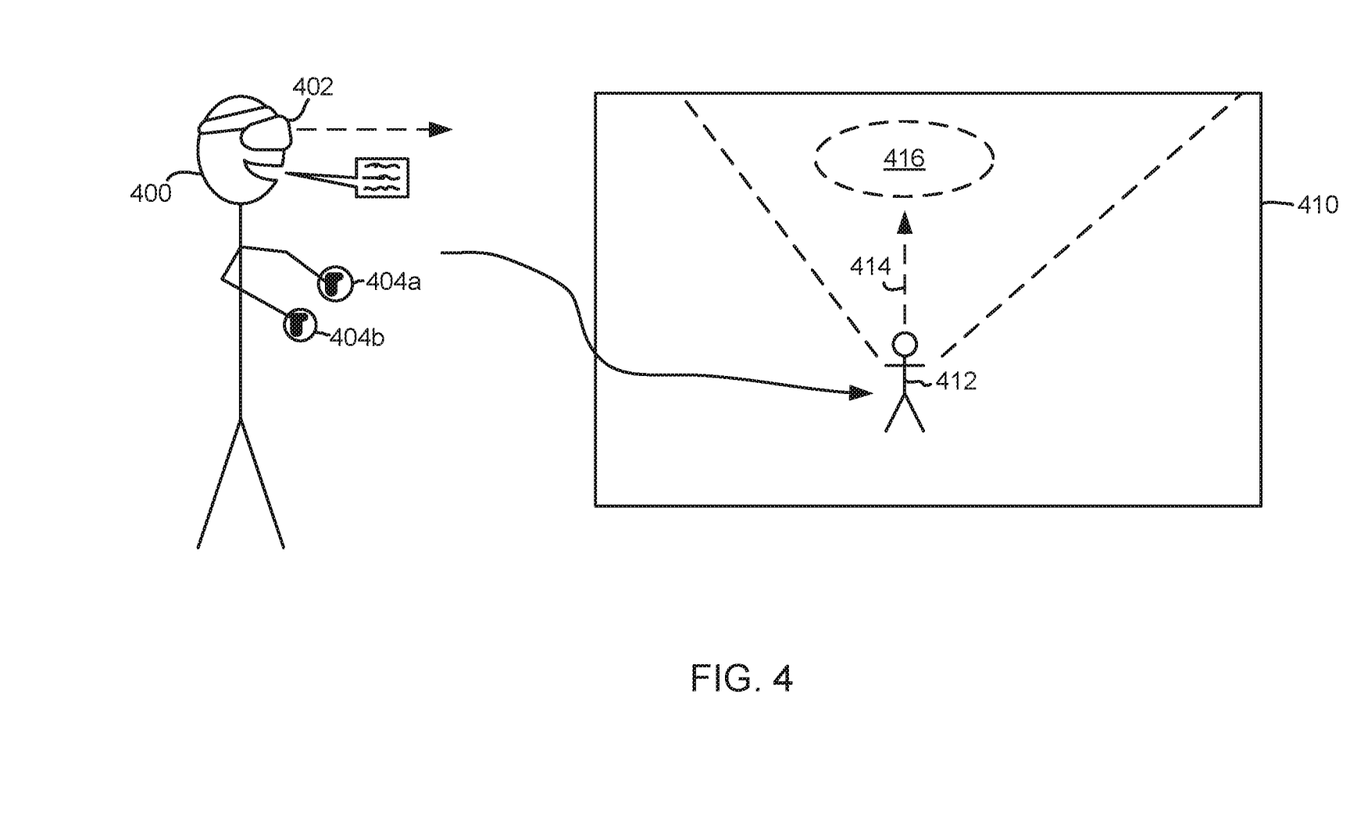
FIG. 4 conceptually illustrates game context prediction for improving speech recognition during gameplay of a video game, in accordance with implementations of the disclosure.

FIG. 4 conceptually illustrates game context prediction for improving speech recognition during gameplay of a video game, in accordance with implementations of the disclosure.

In the illustrated implementation, a player 400 is experiencing a video game through a VR headset (or head-mounted display) 402. The player may operate controllers 404*a* and 404*b*, and may also issue voice commands or other speech pertaining to the video game. The player 400 views a virtual environment 410, which can be from the perspective of the player's avatar 412 in the virtual environment. It will be appreciated that the VR headset 402 provides the player 400 with an immersive view of the virtual environment 410.

In some implementations, in addition to determining gameplay context to improve speech recognition, future gameplay activity and context can be predicted based on current game state data, and this future gameplay activity/context can also be used to improve speech recognition. For example, the player 400 may be looking in a given direction 414 in the virtual environment 410, or moving in the direction 414. Based on such viewing direction or movement the system (e.g. including a machine learning model that analyzes game state as previously described) may predict that the player's future game context will include a virtual location within a region 416 of the virtual environment 410. This data can be used to tune the speech recognition model in advance of the player arriving at the region

416, to for example, favor words or phrases likely to be spoken when at the region 416.

While predicted future location in a virtual environment is described, it will be appreciated that other types of gameplay context information, such as the examples described above, can be predicted, and used to enhance the speech recognition process of a player of a video game during gameplay.

Figure 5:
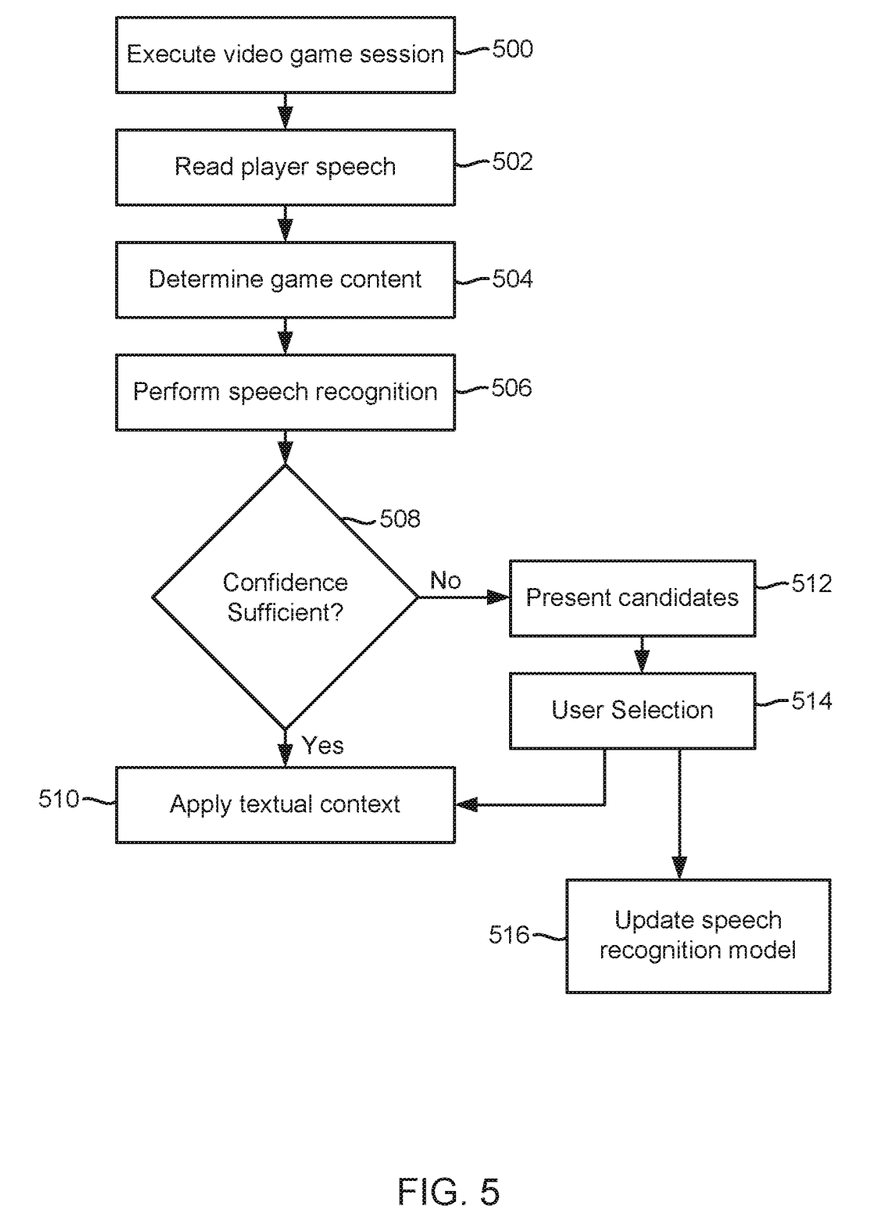
FIG. 5 conceptually illustrates a method for applying speech recognition during a video game, in accordance with implementations of the disclosure.

FIG. 5 conceptually illustrates a method for applying speech recognition during a video game, in accordance with implementations of the disclosure.

At method operation 500, execution of a session of a video game is initiated. At method operation 502, player speech occurring during gameplay of the video game is recorded.

At method operation 504, a current context of the gameplay during which the player speech occurs is determined, such as by analyzing the game state of the executing session. At method operation 506, the determined context of the gameplay is applied to a speech recognition process, and speech recognition that incorporates the gameplay context is performed on the recorded speech to determine the textual content of the player's speech.

At method operation 508, a confidence level of the results of the speech recognition is determined. If the confidence level exceeds a predefined threshold indicating a sufficiently high confidence in the results of the speech recognition, then, at method operation 510, the textual content of the player's speech as determined by the speech recognition is applied to the gameplay of the video game, such as by triggering a command or some other action in the session of the video game.

If the confidence level does not exceed the predefined threshold, then at method operation 512, candidate words/phrases as determined by the speech recognition process are presented to the player as possible interpretations of the player's speech. At method operation 514, the player input is received identifying one of the candidates as the correct interpretation. Once the correct interpretation is identified, then the relevant textual content is applied to the video game at method operation 510 as previously discussed. Additionally, at method operation 516, the identification of the correct interpretation of the player's speech is used to improve the speech recognition, such as by updating/training/tuning a speech recognition model.

In some implementations as described herein, analysis of the game context and speech recognition are performed by separate models. However, in other implementations, a single speech recognition model is configured to evaluate game context and perform speech recognition together. That is, in some implementations, a speech recognition model can be configured to accept game state data (indicating the game context) and recorded speech of the player, and perform contextual speech recognition.

In other implementations, there can be multiple speech recognition models that are specific to different game contexts. For example, a first speech recognition model may be trained and configured to recognize speech occurring during a first stage/scene of a video game, and a second speech recognition model is trained and configured to recognize speech occurring during a second stage/scene of the video game, etc.

Figure 6:
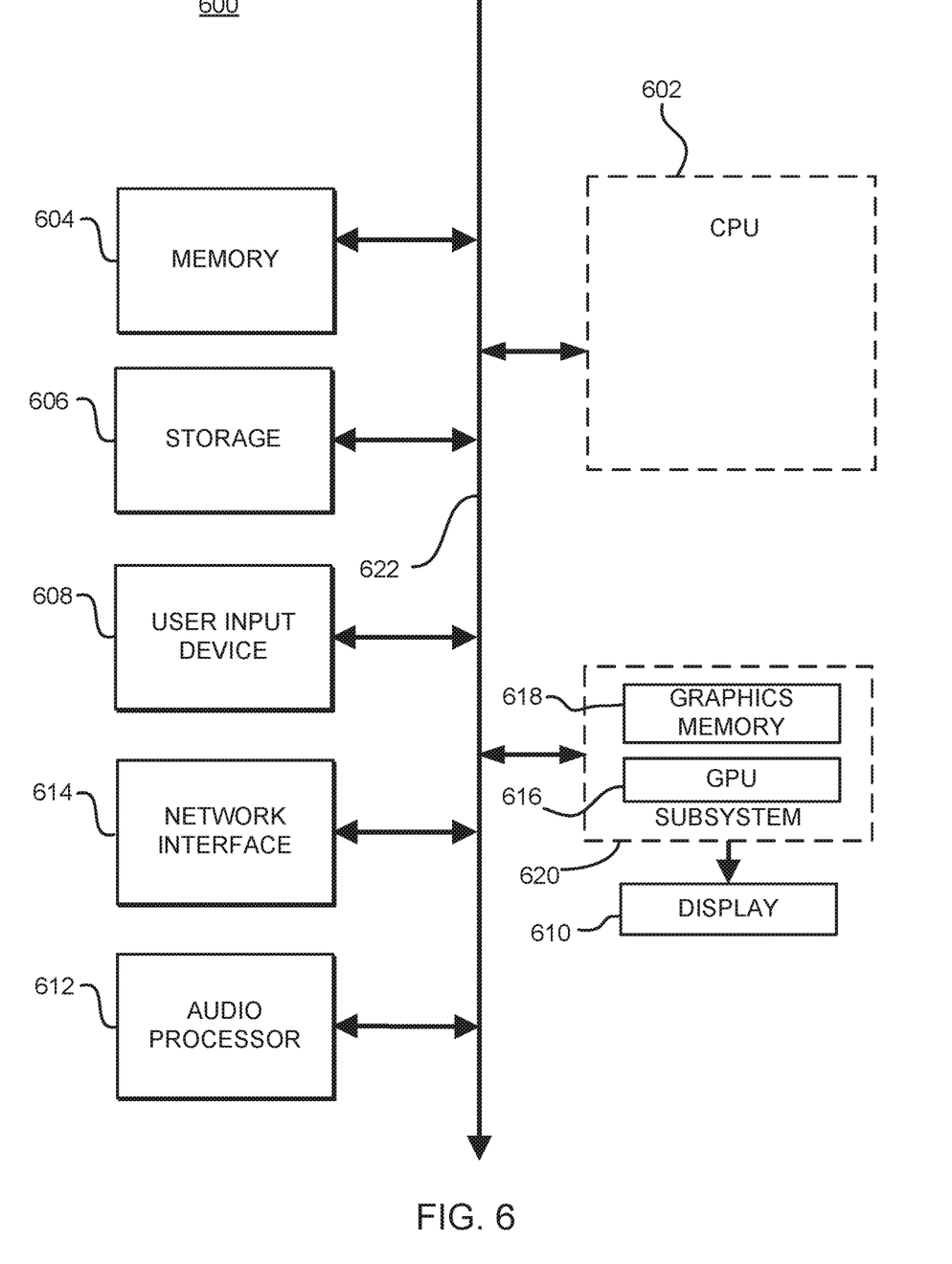
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for executing a session of a video game, comprising:
    recording speech of a player engaged in gameplay of the session of the video game;
    analyzing the recorded speech using a speech recognition model, which identifies a plurality of candidate words as possible interpretations of the speech of the player;
    during the session of the video game, presenting the plurality of candidate words to the player;
    receiving selection input from the player identifying one of the candidate words as a correct interpretation of the speech of the player; and
    applying the selected one of the candidate words by the video game as a gameplay input for the video game.

2. The method of claim 1, wherein presenting the plurality of candidate words is responsive to a level of confidence of recognition by the speech recognition model falling below a predefined threshold.

3. The method of claim 1, wherein presenting the candidate words to the player includes presenting the candidate words in video generated from the session of the video game.

4. The method of claim 1, wherein presenting the candidate words pauses the gameplay until the selection input has been received.

5. The method of claim 1, wherein applying the selected one of the candidate words includes triggering a command for the gameplay of the video game.

6. The method of claim 1, wherein the selected one of the candidate words is used as feedback to refine the speech recognition model.

7. The method of claim 1, wherein receiving selection input is through an input device of a controller.

* * * * *